Sept. 11, 1956

B. WANDEL

UNITARY SHOULDER SUPPORT AND READING LIGHT ATTACHMENT FOR A TELEPHONE

Filed March 3, 1954

2,762,868

INVENTOR.
BRONISLAW WANDEL
BY Edgar O. Rost
ATTORNEY

United States Patent Office 2,762,868

Patented Sept. 11, 1956

2,762,868

UNITARY SHOULDER SUPPORT AND READING LIGHT ATTACHMENT FOR A TELEPHONE

Bronislaw Wandel, Boston, Mass.

Application March 3, 1954, Serial No. 413,884

5 Claims. (Cl. 179—157)

The present invention relates to improvements in devices for supporting telephone apparatus, and more particularly to a novel combination of a shoulder support and reading light attachment for a hand telephone.

Telephone supporting devices for eliminating the manual holding of the receiver-transmitter unit during lengthy conversations have greatly enhanced the efficiency of clerical employees, as well as persons in the professions. Various prior art embodiments have been constructed of spongy or soft rubber compositions or coated therewith to aid in preventing any movement when pressure is applied to the receiver-transmitter apparatus to hold the support against the shoulder of the user. Such embodiments will cause some soiling of the clothing after frequent usage, and they are somewhat bulky when anchored to the telephone apparatus.

Further, since the telephone may frequently be found in poorly lighted areas or may be used at night, some source of illumination, readily accessible to the user, is desirable.

It is, therefore, an object of the present invention to provide a novel combination of a shoulder support and reading light attachment which is simply and easily attached to a telephone of the type having a separate receiver-transmitter unit.

Another object of the invention is to provide a novel shoulder support and reading light attachment for a telephone in a unitary structure that is inexpensive, durable and constructed of a light-weight non-soiling material.

A further object is to provide in a novel shoulder support and reading light attachment for a telephone means for displaying advertising literature so as to be readily visible to the user.

The objects, advantages and features of the invention will be readily appreciated after consideration of the following detailed specification and attached drawings, in which.

Figures 1, 2, 3, 4, 5, 6:
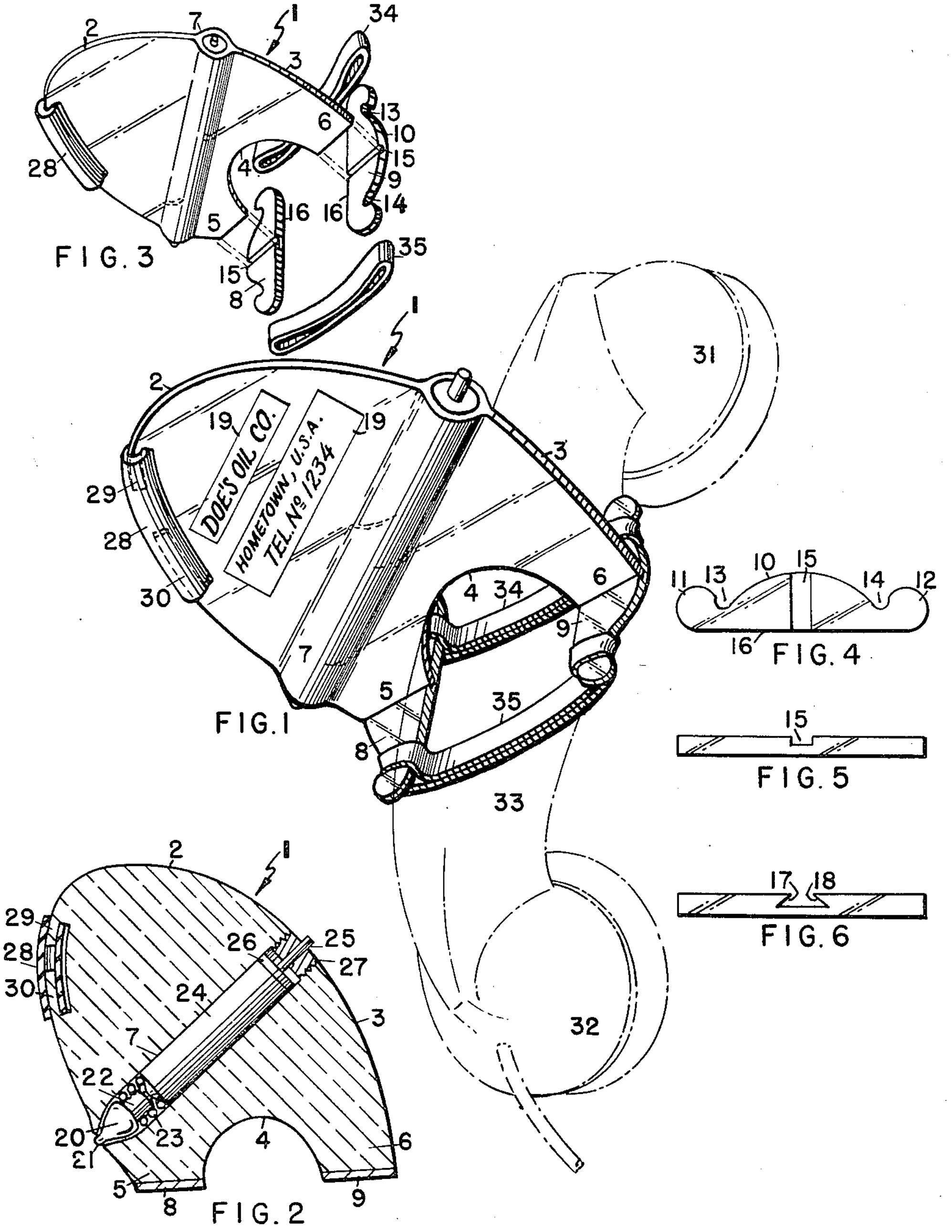
Figure 1 is a perspective view of the embodiment of the invention mounted in its desired position on a telephone unit, shown in dotted lines.
Figure 2 is a detailed vertical cross sectional view of the embodiment.
Figure 3 is an exploded perspective view showing the relationship of the components of the illustrative embodiment.
Figure 4 is a top plan view of one of the components.
Figure 5 is an end view of the component shown in Figure 4.
Figure 6 is an end view of a modification of the component shown in Figures 4 and 5.

Referring now to the drawings, Figure 1 is an illustrative embodiment of the invention comprising a body member 1 having two susbtantially flat sections 2 and 3 of a general oval outline with section 3 having a straight edge extending perpendicularly to the general longitudinal axis of member 1. Along the straight edge of section 3, I provide a substantially arcuate opening 4 at an intermediate point, thereby forming a pair of opposed spaced arms 5 and 6. Extending diagonally to the general longitudinal axis of member 1 and supported between sections 2 and 3 is a tubular member 7.

To mount the body member 1 in its desired position, I next provide a pair of transverse holding members 8 and 9. As shown in Figure 4, said holding members have on one side a generally bowed intermediate portion 10 with the ends of the member bent backwards as at 11 and 12 to define notches 13 and 14. A slot 15 extends through the width of each member 8 and 9 midway between the ends thereof and has a depth approximately, but not limited to, one-half the thickness of said members. A straight edge 16 extends along the other side of the transverse holding members 8 and 9.

Assembly of the embodiment is accomplished by inserting spaced arms 5 and 6 in slot 15 of each holding member 8 and 9 with the straight edge 16 of each of said holding members opposed in the manner shown in Figures 1 and 3. Slot 15 may be dimensioned to be friction-fitted with arms 5 and 6 or a suitable adhesive may be employed along the meeting edges. Slot 15 may also be modified to provide tapered sides 17 and 18 as shown in Figure 6 to allow for the depositing of a suitable cement along the meeting edges of the sides and bottom of the slot 15.

In the selected embodiment, member 1 comprising sections 2 and 3 and tubular member 7, as well as holding member 8 and 9 were constructed from a plastic material that is substantially translucent, such as lucite. Other compositions containing resins, vinyl resins, polystyrenes or urea formaldehydes either thermoplastic or thermoset may be utilized if desired. Since a considerable portion of section 2 is clearly visible to the user, advertising literature may be printed in the area shown for example at 19. Other plastic or similar materials may be employed in any color desired or density to enhance the attractiveness of the embodiment, as well as to further add to the advertising features.

Illumination of, for example the dial of the telephone is provided simply and economically by means housed within tubular member 7. As shown in detail in Figure 2, said illumination means comprises an electric lamp 20 of the type having a pre-focused lens 21 integral therewith. To retain said lamp 20 in its desired position tubular housing 7 may be tapered along the inner walls to conform to the lamp outline. Lens 21 projects a short distance beyond the periphery of member 1 to provide the light rays on a desired surface. Contacting lamp 20 and encircling base 22 of said lamp is a resilient spring 23. Battery 24 of the narrow elongated type employed in small flash lights rests against the other end of spring 23. In the normal "off" position, spring 23 will urge battery 24 away from the contact point on lamp base 22. A plunger 25 with a transverse cylindrical disc 26 at one end thereof is provided in contact with one end of battery 24. Cap 27 having a central opening through which plunger 25 extends is in threaded engagement with the inner walls of tubular member 7 and retains the plunger in its desired position. By manually depressing the plunger 25 the reading light will be in the "on" position with battery 24 contacting bulb base 23.

Along the outer edge of section 2 in the general area where support member 1 contacts the shoulder of the user, a short length of rubber tubing 28 may be provided. Tubing 28 is positioned by means of opposed fingers 29 and 30 formed along the outer edge of section 2 with finger 30 being slightly longer than finger 29. By slipping tubing 28 over finger 30 and lightly compressing the tubing until it will slide over finger 29 this component is easily assembled and may be replaced whenever desired.

The illustrative embodiment of the invention may be attached to the telephone apparatus of the type comprising a receiver 31 and transmitter 32 connected by a handle or shank 33 simply by placing member 1 over any desired portion of the shank 33 with the opening 4 engaging said shank. Elastic bands, such as 34 and 35, may then be stretched between opposing notches 13 and 14 in holding members 8 and 9 with the intermediate portion of said bands engaging the underside of shank 33. In this method of mounting, the elastic bands not only prevent movement of the mounted shoulder support and reading light but assure continued usage of my invention since they are readily replaceable. Further, any number or shape may be employed of the types commercially available. This method of mounting also makes the embodiment universally adaptable to all shapes and sizes of telephone receiver-transmitter units.

Thus I provide, in a simple unitary structure, an efficient telephone shoulder support and reading light with additional advantages as an advertising medium. While I have described a specific embodiment of the invention, various modifications or alterations will occur to those skilled in the art, such as for example, molding of the body member and holding members as an integral unit. It is, therefore, my intention to cover in the appended claims such modification or alterations as fall within the spirit and scope of the invention.

What is claimed is:

1. The combination of a shoulder support and reading light attachment for a telephone comprising a body member having substantially flat end sections and a tubular member intermediate the ends of said body member, a pair of spaced arms defining an opening therebetween formed at one end of said body member, a pair of holding members extending perpendicularly to the plane of said body member and an electric lamp within said tubular member in position to direct light rays outwardly from said member.

2. The combination of a shoulder support and reading light attachment for a telephone comprising a body member having two substantially flat sections and a tubular member intermediate the ends thereof, said tubular member extending diagonally to the longitudinal axis of said body member, a pair of spaced arms defining an arcuate opening therebetween formed at one end of said body member, a pair of transverse holding members extending perpendicularly to the plane of said body member and affixed to said spaced arms and an electric lamp within said tubular member in position to direct light rays downwardly and outwardly from said member.

3. The combination as claimed in claim 2 and rubber means for cushoning said body member extending along a portion of the periphery of said body member.

4. The combination of a shoulder support and reading light attachment for a telephone comprising a body member of a plastic material, said body member having two substantially flat end sections with a tubular intermediate section therebetween, said tubular intermediate section extending diagonally to the longitudinal axis of said body member, a pair of opposed spaced arms defining an arcuate opening therebetween formed at one end of said body member, a pair of transverse holding members of a similar material extending perpendicularly to the plane of said body member, each of said holding members having a pair of notches formed on a side thereof and a slot extending throughout its width at a point intermediate the ends thereof, said spaced arms of said body member being positioned in and affixed to said slots, structure defining a pair of opposed elongated fingers formed along the periphery of one of said flat end sections with a short length of a rubber tubulation supported by said elongated fingers, an electric lamp within said tubular intermediate section in position to direct light rays downwardly and outwardly from said section.

5. The combination according to claim 4 in which the outside diameter of said tubular intermediate section is greater than the width of the abutting flat end sections.

References Cited in the file of this patent

UNITED STATES PATENTS

| | | |
|---|---|---|
| 2,521,162 | Harris | Sept. 5, 1950 |
| 2,610,262 | Cunningham | Sept. 9, 1952 |